US010685121B2

(12) United States Patent
Tang et al.

(10) Patent No.: US 10,685,121 B2
(45) Date of Patent: Jun. 16, 2020

(54) SECURE ENVIRONMENT EXAMINATION

(71) Applicant: QUANTA COMPUTER INC., Taoyuan (TW)

(72) Inventors: I-Kuang Tang, Taoyuan (TW); Wei-Yu Chien, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 269 days.

(21) Appl. No.: 15/786,269

(22) Filed: Oct. 17, 2017

(65) Prior Publication Data
US 2019/0114432 A1   Apr. 18, 2019

(51) Int. Cl.
G06F 21/00   (2013.01)
G06F 21/57   (2013.01)
G06F 1/26   (2006.01)
H04L 29/06   (2006.01)
G06F 21/81   (2013.01)
G06F 21/51   (2013.01)

(52) U.S. Cl.
CPC .............. G06F 21/575 (2013.01); G06F 1/26 (2013.01); G06F 21/81 (2013.01); H04L 63/10 (2013.01); G06F 21/51 (2013.01)

(58) Field of Classification Search
CPC .......... G06F 21/575; G06F 1/26; G06F 21/81; G06F 21/51; H04L 63/10
See application file for complete search history.

(56) References Cited

U.S. PATENT DOCUMENTS 6,754,716 B1 *  6/2004  Sharma ............. H04L 29/12009
                                                   709/230
9,461,873 B1 * 10/2016  Marr ....................... H04L 41/00
2002/0107961 A1 *  8/2002  Kinoshita ........... H04L 63/0272
                                                   709/225

(Continued)

FOREIGN PATENT DOCUMENTS

JP    2012-532358 A   12/2012
TW      201401098 A    1/2014
WO    2007052342 A1    5/2007

OTHER PUBLICATIONS

Extended European Search Report for EP Application No. 18160160.0, dated Oct. 5, 2018.

(Continued)

Primary Examiner — Sarah Su
(74) Attorney, Agent, or Firm — Nixon Peabody LLP

(57) ABSTRACT

What is disclosed is a system and method to secure a network device such as a server. The network device has a memory storing a static credential file. A basic input output system operates a security module that gathers an IP address of the router and an IP address of the network device, via a query to a network manager when power is enabled to the network device. The gathered IP addresses are compared with stored IP addresses in the static credential file. The operating system of the network device is prevented from booting if the IP addresses do not match. In addition, a baseboard management controller is operable to receive an encrypted credential file. The encrypted credential file is decrypted and compared with the static content file. The baseboard management controller shuts down power to the network device if the credential file does not match the static content file.

19 Claims, 8 Drawing Sheets

(56) References Cited

U.S. PATENT DOCUMENTS

| | | | |
|---|---|---|---|
| 2005/0220076 A1* | 10/2005 | Kokado | H04L 12/2854 370/351 |
| 2006/0212732 A1* | 9/2006 | Mashimo | H04L 29/12028 713/300 |
| 2009/0017789 A1* | 1/2009 | Thomas | H04L 12/14 455/406 |
| 2009/0193103 A1* | 7/2009 | Small | H04L 61/2084 709/221 |
| 2010/0257357 A1 | 10/2010 | McClain | |
| 2012/0084430 A1* | 4/2012 | Lu | G06Q 30/02 709/224 |
| 2013/0160139 A1* | 6/2013 | Goel | G06F 21/57 726/27 |
| 2013/0166896 A1* | 6/2013 | Peng | G06F 13/102 713/2 |
| 2014/0365755 A1 | 12/2014 | Liu et al. | |
| 2017/0012770 A1 | 1/2017 | Lin et al. | |
| 2017/0134373 A1 | 5/2017 | Li | |
| 2019/0114432 A1* | 4/2019 | Tang | G06F 21/81 |

OTHER PUBLICATIONS

TW Office Action for Application No. 107104391 dated Jan. 29, 2019, w/ First Office Action Summary.
TW Search Report for Application No. 107104391 dated Jan. 29, 2019, w/ First Office Action.
JP Office Action for Application No. 2018-060823, dated Jun. 4, 2019, w/ First Office Action Summary.
Utilization of TPM; Android Security Bible 2013; 2013, Chapter 3, 8 pages (1 page translation).

\* cited by examiner

| Provisioning switch | Comment |
|---|---|
| Disabled | Administrator disables secure Environment Examination, provisioning process is invalid. |
| Enabled | Administrator enables secure Environment Examination, both UEFI BIOS and BMC have to start provisioning process and configuration. |
| Provisioned | Both UEFI BIOS and BMC complete provisioning process, enable examine switch. |

FIG. 8A

| Examine switch | Comment |
|---|---|
| Disabled | Secure Environment Examination is disabled, both BMC and UEFI BIOS doesn't need to examine network environment. |
| Enabled | Secure Environment Examination is enabled, both BMC and UEFI BIOS start to examine network environment. |

FIG. 8B

SECURE ENVIRONMENT EXAMINATION

TECHNICAL FIELD

The present disclosure relates generally to a security system for network devices. More particularly, aspects of this disclosure relate to adding a security authentication protocol before allowing a network device to power up.

BACKGROUND

The emergence of the cloud for computing applications has increased the demand for off-site installations, known as data centers, which store data for remotely connected computer device users. Such data centers typically have massive numbers of racks, plus massive numbers of servers mounted therein to store and manage data. For example, a typical data center may include tens of thousands, or even hundreds of thousands, of devices in hundreds or thousands of individual racks.

Each of the servers in a typical data center stores data and allows access to data from networked devices. Given the plethora of potentially valuable data, there is a need to prevent unscrupulous individuals from stealing the data. FIG. 1 shows a prior art data center system 10 that includes multiple servers 12 in a rack 20. The servers 12 are connected to a network 14 for management of the servers 12. The current security system of such a rack 20 examines firmware integrity of the platform, reviews consistent hardware components of a server motherboard, and verifies authentication of the operating system and user accounts. The current security system requires a login for a device on the network environment to access the server 12.

A secure server is deemed a high security hardware base root of a trusted platform. From the moment power is applied to a server 12, a security process begins to examine firmware integrity of platform; review consistent hardware components of the server motherboard; and verify authentication of the operation system and user accounts and safety network environment. There are two existing secure technologies to support server protection. One involves the Unified Extensible Firmware Interface (UEFI) secure boot, and the other is the Intel® Trusted Execution Technology (TXT) and Trusted Platform Module (TPM). Part of the security process is run from a different entity and can be activity and inactivity by an administrator or a user with the correct authentication. Hence, a secure server could be powered on from the root of trust firmware. The trust firmware may be a hardware base validation of the UEFI power-on self-test (POST) process until booting into a legal operating system with sufficient certification is performed.

In the process of powering a server until it loads the operating system with full software functionality, several and distinct secure examinations must be passed. These secure functions are generic security analyses based on referencing existing security design guides, and automatically inspecting all necessary components. Such necessary components include firmware, hardware, and software of the server platform 12. Once the operating system of the server 12 platform boots properly with all the secure examinations performed successfully, a user with the correct authority can log in to the operating system by using a user name and password. Once proper credentials are presented, the user can activate all software services of the server. The operating system of the server platform may use the Extensible Authentication Protocol (EAP) to authenticate network access for Point-to-Point Protocol (PPP) connections. For IEEE 802.1X-based network access to authenticating Ethernet switches and wireless access points (APs), the EAP is used to establish a trust network connection prior to exchange data through the intranet.

One of potential risk despite these security features is that there is no examination as to whether the network is authentic. Thus, such security features may be circumvented by an individual who covertly obtains an authentic credential such as a user name and password, or if an authorized individual decides to act illegally. In such an instance, an individual may be able to access the actual server if the server is removed from a secured location. Further, there is no method to prevent the server from functioning if a fake user obtains authorization and pretends to be an administrator. Such a process allows unauthorized exposure of the data stored on the server. Further, technical features of the server may be learned under malicious inspection. These scenarios could occur during a server return material authorization (RMA) process, or when the server is stolen by a competitor from the data center.

For example, as shown in FIG. 1, a secure server may not always be located at a safe room or environment with secure protection. A server 16 may be handed over to a vulnerable place when going through Return Material Authorization (RMA) process, or an unscrupulous employee 18 may hand carry the server 16 to a competitor's company. In either of these cases, with sufficient certification, security keys, significant signatures and a username/password that may be stolen, current secure technologies may be circumvented. A competitor may thus easily explore the contents of the server 16, inspect business data, and exercise valuable functions and features of the server 16. In cases of industrial espionage, this may result in speeding up a competitor's development and business via access to valuable data from the stolen server 16.

Thus, there is a need for a system that protects a physical server from being accessed unless it is properly connected to an authentic network. There is another need for a module that prevents a server from being booted up unless proper network credentials are received. There is also a need for a system that secures a credential file to ensure a server is powered up in a safe environment.

SUMMARY

One disclosed example is a method of protecting a network device coupled to a network in a data center. A credential file associated with the network device is stored. Power is enabled to the network device. The credential file is encrypted. The encrypted credential file is sent to a baseboard management controller of the network device. The encrypted credential file is decrypted. The decrypted credential file is compared with a static content file stored in a memory of the network device. The power to the network device is shutdown if the credential file does not match the static content file.

Another example is a method of protecting a network device coupled to a network in a data center. An IP address of a router of the network and an IP address of the network device is stored in a static content file. On powering up the network device, the IP address of the router and the IP address of the network device are gathered via a query. The gathered IP addresses are compared with the stored IP addresses. An operating system of the network device is prevented from booting if the IP addresses do not match.

Another example is a network device having a memory storing a static credential file, a basic input output system, and an operating system executed by a controller. A security module is operable to gather an IP address of the router and an IP address of the network device, via a query to a network manager from the basic input output system, when power is enabled to the network device. The security module compares the gathered IP addresses with stored IP addresses in the static credential file. The security module prevents the operating system of the network device from booting if the IP addresses do not match. The network device also includes a baseboard management controller controlling power to the network device. The baseboard management controller is operable to receive an encrypted credential file and decrypt the encrypted credential file. The baseboard management controller compares the decrypted credential file with the static content file. The baseboard management controller shuts down power to the network device if the credential file does not match the static content file.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims.

BRIEF DESCRIPTION OF THE DRAWINGS

The disclosure will be better understood from the following description of exemplary embodiments together with reference to the accompanying drawings, in which:

FIG. 8A is a table showing the states of the provisioning switch for the server in FIG. 2; and FIG. 8B is a table showing the states of the examining switch for the server in FIG. 2.

Figure 1:
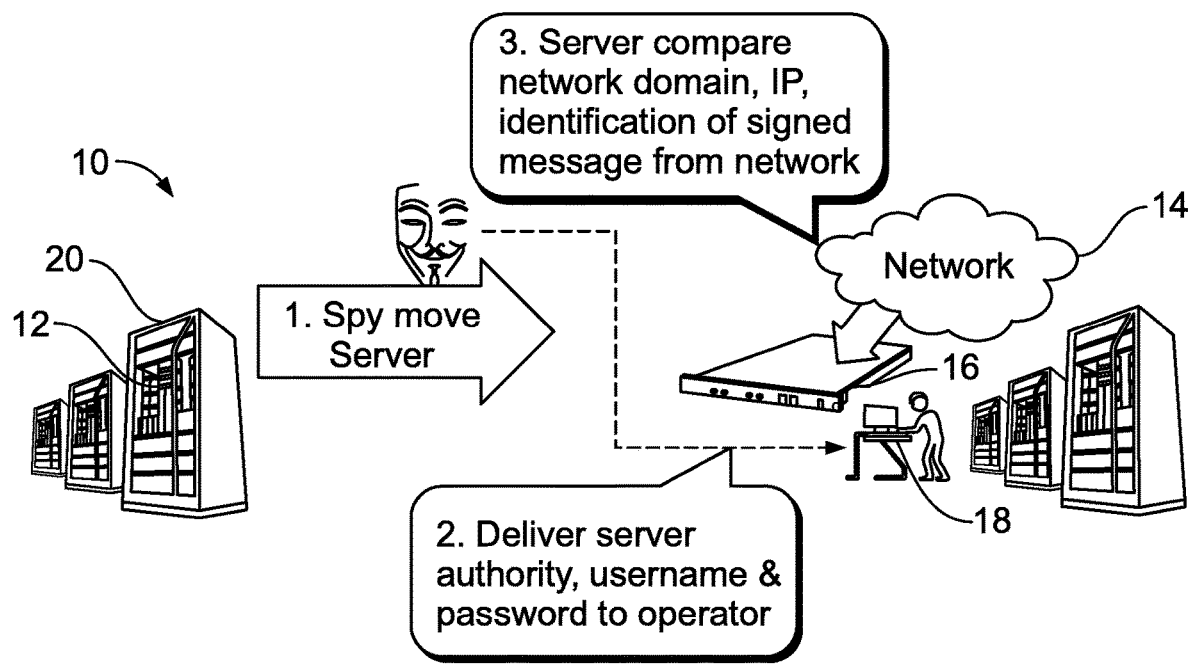
FIG. 1 is a block diagram of a prior art network system that is vulnerable to outsider access to servers.

The present disclosure is susceptible to various modifications and alternative forms, and some representative embodiments have been shown by way of example in the drawings and will be described in detail herein. It should be understood, however, that the invention is not intended to be limited to the particular forms disclosed. Rather, the disclosure is to cover all modifications, equivalents, and alternatives falling within the spirit and scope of the invention as defined by the appended claims.

DETAILED DESCRIPTION

The various embodiments can be embodied in many different forms. Representative embodiments are shown in the drawings, and will herein be described in detail. The present disclosure is an example or illustration of the principles of the present disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference, or otherwise. For purposes of the present detailed description, unless specifically disclaimed, the singular includes the plural and vice versa; and the word "including" means "including without limitation." Moreover, words of approximation, such as "about," "almost," "substantially," "approximately," and the like, can be used herein to mean "at, near, or nearly at," or "within 3-5% of," or "within acceptable manufacturing tolerances," or any logical combination thereof, for example.

Figure 2:
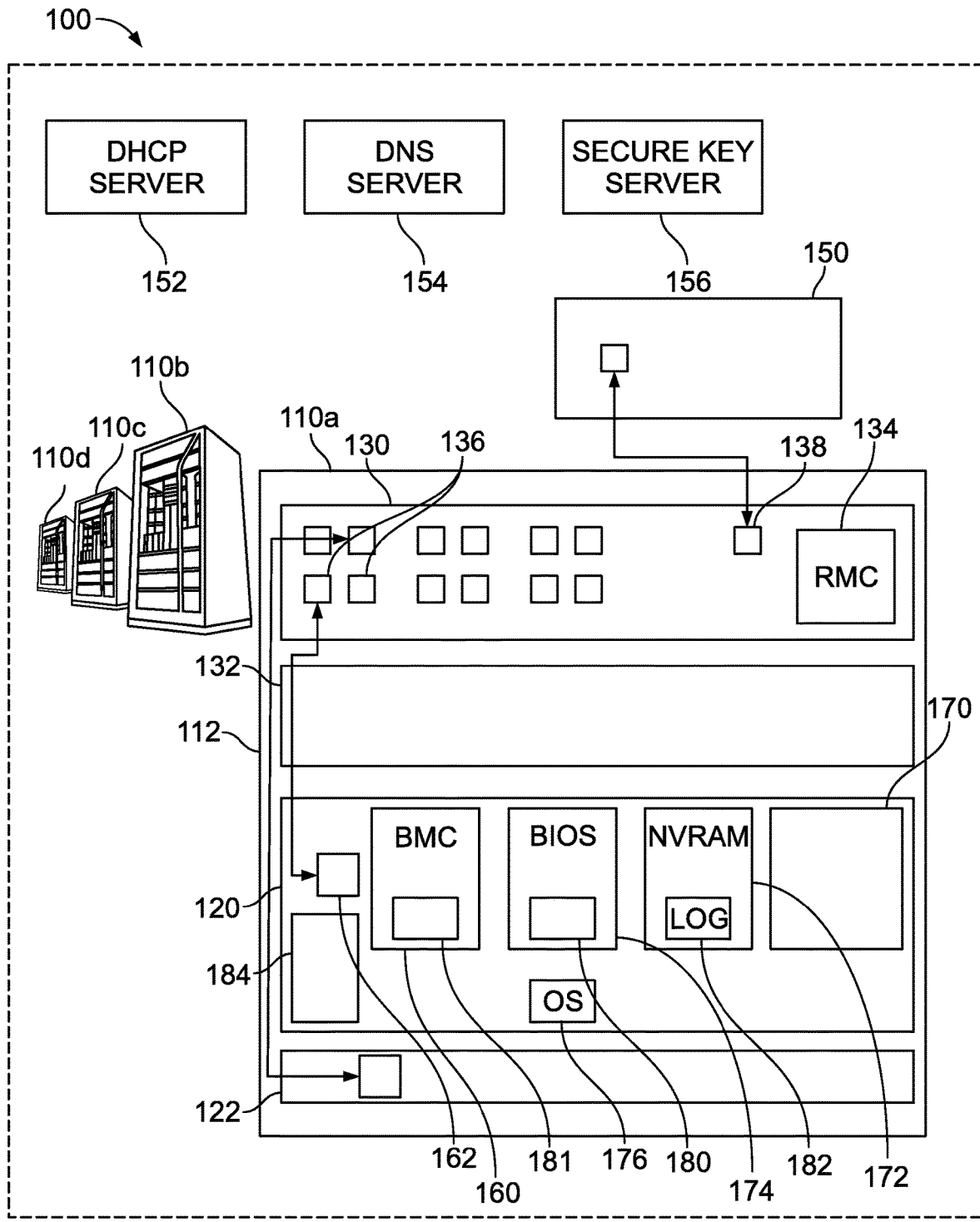
FIG. 2 is a block diagram of a data center that allows protection of a server installed on the network.

FIG. 2 shows a block diagram of a data center 100. The data center 100 includes equipment racks 110a, 110b, 110c and 110d. Of course it is understood that the data center 100 may include hundreds or thousands of equipment racks. The example equipment rack 110a includes a rack frame 112 having a number of slots or chassis. Each of the slots may hold at least one network device, such as servers 120 and 122, associated with the rack 110a. The servers 120 and 122 may be the identical or different types of servers. In this example, the rack 110a includes a management switch 130 and a data switch 132. Each of the switches 130 and 132 include multiple ports for connecting cables to the other network devices such as the servers 120 and 122 installed in the slots in the rack frame 112. A rack management controller 134, which is the controller of the management switch 130 in this example, is associated with the rack 110a. The rack management controller 134 allows management of the network devices such as the server 120 in the rack 110a.

Each of the network devices, such as the server 120, in the rack 110a are connected via a cable to a port 136 of the management switch 130 when the server 120 is first provisioned for the rack 110a. The management switch 130 includes the rack management controller 134 that is coupled to ports 136. The rack management controller 134 is also coupled to a management port 138 that is connected to a network management server 150. The network management server 150 operates and monitors some or all of the racks such as the rack 110a in the data center 100 via a management network.

The data center 100 also includes a d host configuration protocol (DHCP) server 152, a domain name service (DNS) server 154, and a network key management server 156. The DHCP server 152 assigns an IP address to nodes, such as servers that are provisioned to a network of the data center 100. The DNS server 154 provides host names for newly provisioned nodes. As will be explained below, the network key management server 156 generates public and private keys to sign credential/identification files for network devices. Each rack contains network devices coupled to a corresponding management switch such as the management switch 130 that is connected to the network management server 150. Thus, the network management server 150 allows a network or data center administrator to monitor the operation of multiple racks of network devices.

In this example, the server 120 includes a management controller, which may be a baseboard management controller (BMC) 160, which is connected to the management switch 130 via a port 162. The server 120 also includes a controller 170 and a memory 172. Various firmware or software for operating the server 120 includes a BIOS 174 and an operating system 176. A secure environment module 180 is part of the BIOS 174. In this example, the BIOS 174 is a unified extensible firmware interface (UEFI) BIOS. A service log 182 is stored in the memory 172. The controller 170 is installed on a motherboard, along with other components of the server 120. The power to the motherboard and other components in the server 120 are controlled by the baseboard management controller 160. A secure environment service 181 is part of the baseboard management controller 160. An Ethernet controller 184 is connected to the port 162 and manages Ethernet network communication, such as that established with the management switch 130 or the data switch 132.

The data center 100 in FIG. 2 also includes a security mechanism to avoid a server motherboard from powering up and booting in an illegal condition—for example, after a server such as the server 120 is moved and relocated within the data center 100, or moved to another location and thus is not connected to the proper network. The server 120 uses existing security technologies, and the data center monitors the working status of network devices such as the server 120. The data center 100 also uses the secure environment module 180 of the unified extensible firmware interface (UEFI) BIOS 174 on a network device such as the server 120 to pre-examine the network environment. The first set of instructions executed when a new chain of trust is established is termed root of trust firmware. The root of trust firmware may be instructions in a flash chip accessible by the controller 170. Root of trust firmware may use UEFI network protocols to retrieve configuration of network parameters such as the domain name of the network and the Internet protocol (IP) address of the server. The root of trust firmware then verifies this information relating to IP addresses prior to executing the boot process of the BIOS 174 and operating system 176. Further, the baseboard management controller 160 may also verify its identification, and its location on a rack mount by checking a signed message from the rack management controller 134 via the secure environment service 181. If the location or identification is incorrect, an error log is recorded into the system event log (SEL) 182 for the BMC 160. This error log forces the shutdown of the server 120 immediately.

In this example, a level of software communication is added in between a newly provisioned server and the network manager 150 to protect from unauthorized access to the server 120. When a power supply applies power to the server 120, both the UEFI BIOS 174 and the baseboard management controller 160 start a procedure of network parameter examination prior to allowing the operating system 176 to boot. If either the BIOS 174 or the BMC 160 has an unexpected response to the network parameter examination, a policy is executed via the secure environment examination module 180 to abandon the operating system loading process and shutdown power of the server 120 immediately. This protects the server 120 from an unauthorized start up by an individual with proper credentials but who has removed the server from a known network environment such as the management network of the data center 100.

Figure 3:
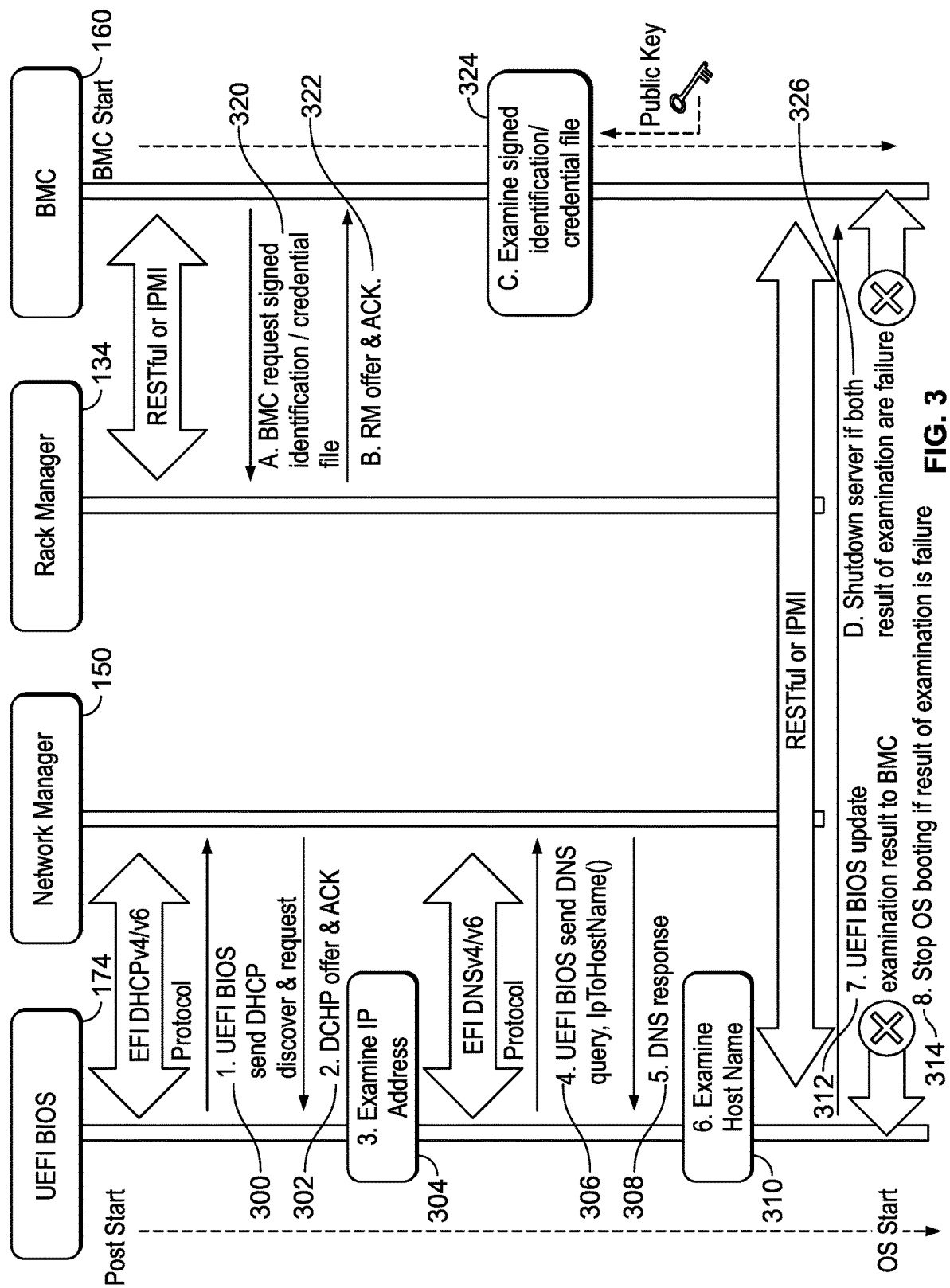
FIG. 3 is a flow diagram of the process of authenticating a server before powering up the server.

FIG. 3 is a flow diagram of exemplary network communication between the components in FIG. 2 to protect the server 120 from unauthorized access. In particular, communication between the UEFI BIOS 174, the network manager server 150, the rack management controller 134 and the baseboard management controller 160 when the server 120 is powered up. The network manager 150 uses an extensible frame interface (EFI) Network Protocol to obtain necessary network environment parameters during a power-on self-test (POST) process conducted when the server 120 is powered up.

During the provisioning process of the server 120, the UEFI BIOS 174 installs the appropriate network protocols once an Ethernet controller such as the Ethernet controller 184 is detected and initialed. The network protocols installed may include the EFI_DHCPv4 Protocol, the EFI_DHCPv6 Protocol, the EFI_DNSv4 protocol and the EFI_DNSv6 Protocol. The network manager 150 may also use the EFI DNS protocol to perform a IPv4/IPv6 IP address to host name translation.

The power up of the server 120 includes the UEFI BIOS 174 sending a DHCP discovery request under the EFI_DNSv4 protocol or EFI_DNSv6 Protocol (300). A responding DHCP discovery offer and acknowledgement is sent to the UEFI BIOS 174 (302). The UEFI BIOS 174 uses the secure environment examination module 180 (FIG. 2) to invoke the EFI dynamic host configuration protocol (DHCP), then gather and examine the IP address of the server such as the server 120 (304). The IP address of a connected router such as the switch 130 is also gathered. The subnet mark of the connected network such as the network associated with the rack 110*a* is also acquired from the DHCP server 152 in FIG. 2. The subnet mark is defined by the UEFI specification Ethernet protocol as the device's current subnet mask. This field is initialized to a zero address by the Start( ) function. The process sends a domain system (DNS) query to the network manager 150 via the EFI_DNSv4 protocol or EFI_DNSv6 Protocol (306). A DNS response is received thereafter by the UEFI BIOS 174 (308). The secure module 180 may examine the host name from the DNS response (310). The UEFI BIOS 174 updates the examination result of the DCHP and DNS response to the BMC 160 (312). The secure environment examination module 180 compares the string of the IP address of the server, the IP address of the router, the Subnet mark, and the host name with static content data of the IP address of the server, the IP address of the router, the Subnet mark, and the host name previously stored during the provisioning process. Where the result of comparison is a fault, the UEFI BIOS 174 sends the error log to the BMC 160 of the server 120 and stops the booting process of the operating system 176 in FIG. 2 thereby preserving the data integrity of the server 120 (314).

In addition, on startup of the server 120, the secure environment service 181 of the BMC 160 sends a request for a signed identification/credential file (320). The BMC request is received by the rack management controller 134 for an identification/credential file. A secured identification/credential file is sent to the BMC 160 from the rack management controller 134 (322). The BMC 160 decrypts and examines the signed identification credential file from the rack management controller 134 (324). The BMC 160 shuts down the server if the result of the examination is a failure (326).

Figure 4:
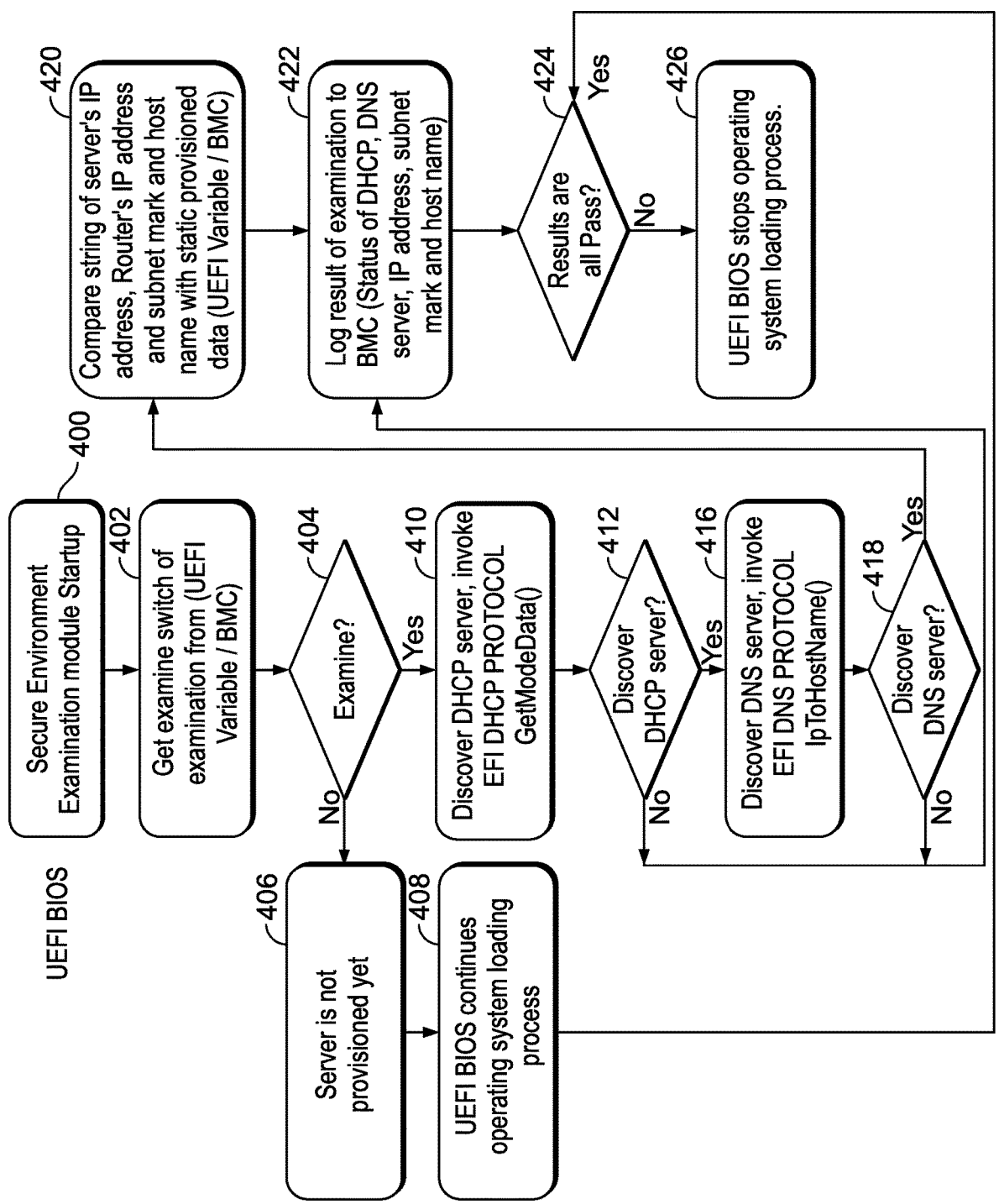
FIG. 4 is a flow diagram of the security module in FIG. 3 running on a BIOS to compare IP addresses before authorizing server boot up.

FIG. 4 shows a flow diagram of the process executed by the UEFI BIOS 174 in FIG. 3 to examine the IP address of the server, the IP address of the router, the subnet mark, and host name, to insure legitimate network credentials when the server 120 in FIG. 2 is powered up. The secure environment examination module 180 is first activated (400). The UEFI BIOS 174 gets an examine switch out of an appropriate UEFI variable set by the secure environment examination module 180 from the BIOS 174 or gathered from the BMC 160 through an IPMI/Redfish command (402). The switch connection of the server 120 to the switch 130 in FIG. 2 is examined (404). If the examine switch is disabled, the server 120 is not provisioned yet or the secure environment examination process may be disabled by an administrator (406). The module 180 then allows the operating system loading process to be executed for purposes such as provisioning the server 120 (408). If the examine switch is enabled in step 404, the module 180 discovers the DHCP server 152 (in FIG. 2) and invokes the EFI DHCP protocol to get the mode data such as the IP address of the server, the IP address of the router, and the subnet mark (410). The module 180 then determines whether the DHCP server 152 is discoverable (412). If the DHCP server 152 is discoverable, then the module 180 discovers the DNS server 154 in FIG. 2, and invokes the EFP DNS protocol to discover the domain name (416). The module 180 then determines whether the DNS server 154 is discovered (418). If the DNS server 154 is discovered, then the module 180 compares the string of the discovered IP address of the server, the discovered IP address of the router, and the subnet mark and host name with static provisioned data of the string (420). The result of the comparison is logged to the BMC 160 (422). The module 180 then determines whether all of the results in the string are successfully compared with the static provisioned data and thus are a pass (424). If the results pass, the module 180 then allows the operating system of the server 120 to continue to load (408). If the results do not pass, the UEFI BIOS 174 stops the loading process of the operating system 176 in FIG. 2, thus preventing access to the server 120 (426). If either the DHCP server 152 in step 412, or the DNS server 154 in step 416, is not discoverable, then the module logs these results as a check fail (422).

Figure 5:
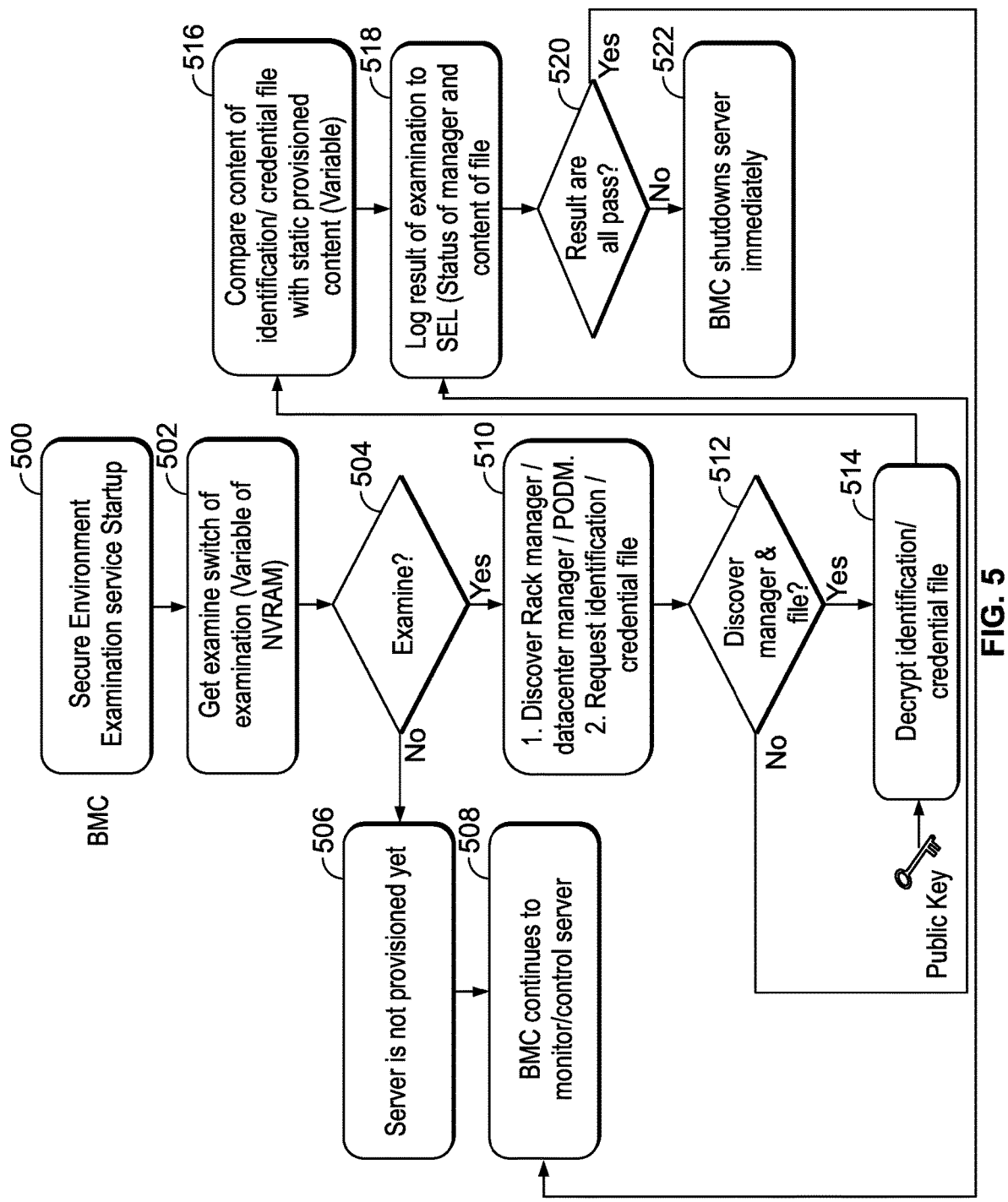
FIG. 5 is a flow diagram of the security module in FIG. 3 running a service through a baseboard management controller in FIG. 2 to check an encrypted credential/identification file.

FIG. 5 shows a flow diagram of network communication between the BMC 160 and the rack management controller 134 to request a signed identification/credential file after the server 120 is powered up in FIG. 3. The BMC 160 uses the secure environment examination service 181 to request a signed identification/credential file from the rack management controller 134 as shown in step 320 in FIG. 3. The identification/credential file is a data structure that includes a certificate type and a signature, defined by the UEFI specification. The server identification is a data structure that includes the server name and the server configuration is a data structure that includes the hardware configuration type. The request may use network protocol that could be the IPMI/Redfish protocol, which is a Hypertext Transfer Protocol (HTTP) over Secure Sockets Layer (SSL), HTTP over Transport Layer Security (TLS), or Redfish Application Programming Interface (API). The BMC 160 and rack management controller 134 use an associated pair of public and private keys to encrypt and decrypt a credential/identification file. The BMC 160 then compares the content of the credential/identification file with static content provided during the provisioning of the server 120 in the data center 100. If the result of comparison is a fault, the BMC 160 shuts down the power to the server 120 immediately. Data stored on the server is protected since the server 120 cannot be operated.

The secure environment examination service 181 is started (500). The service 181 gets an examine switch setting, which is a variable stored in the internal memory of the baseboard management controller 160 in FIG. 2 (502). The service 181 determines whether the examine variable is enabled (504). If the variable is not enabled, the service determines that the server 120 is not provisioned or the security process has been disabled by an administrator (506). The BMC 160 then continues to monitor/control the server 120 (508). If the examine variable is enabled, the service discovers the rack management controller 134 and the credential/identification file is available, as well as the pod manager (PODM) if applicable. The PODM uses Redfish API to communicate with a collection of physical racks that makeup a pod. The PODM manages and aggregates the hardware resources within multiple racks in the pod by polling respective servers. The service 181 then requests the identification/credential file (510). The server then determines whether the rack manger and identification/credential file may be discovered and requests the identification/credential file if the rack manager is discovered (512). If the rack manager and identification/credential file may be discovered, then the service 181 decrypts the discovered identification/credential file using a public key (514). The service 181 compares the content of the decrypted identification/credential file received from the rack management controller 134 with the static provisioned content stored in the memory 172 (516). The results of the examination of the comparison are logged to the system event log 182 in FIG. 2 (518). The service 181 determines whether the results of the comparison are a pass (520). If the results are the same, indicating all pass, then the service 181 loops to step 508 allowing the BMC 160 to continue to monitor/control the server 120. If the results do not pass, the BMC 160 shuts down the server 120 by powering down the server 120 (522). If the rack management controller 134 and identification/credential file are not discovered in step 512, then the service 181 logs the results of the examination as not passing in step 518, and proceeds to shut down the server 120 (520).

A server, such as the server 120, with the secure environment examination module 180 enabled, must perform a provisioning process once the server 120 is deployed into a data center, such as the data center 100 in FIG. 2. Only the administrator of the data center or the rack manager has the authority to disable the examine variable of the secure environment examination module 180 prior to reallocating the server 120 to a distinct location. Thus a malicious individual stealing or moving the server 120 cannot change the examine enabled setting of the secure environment examination module 180.

Figure 6:
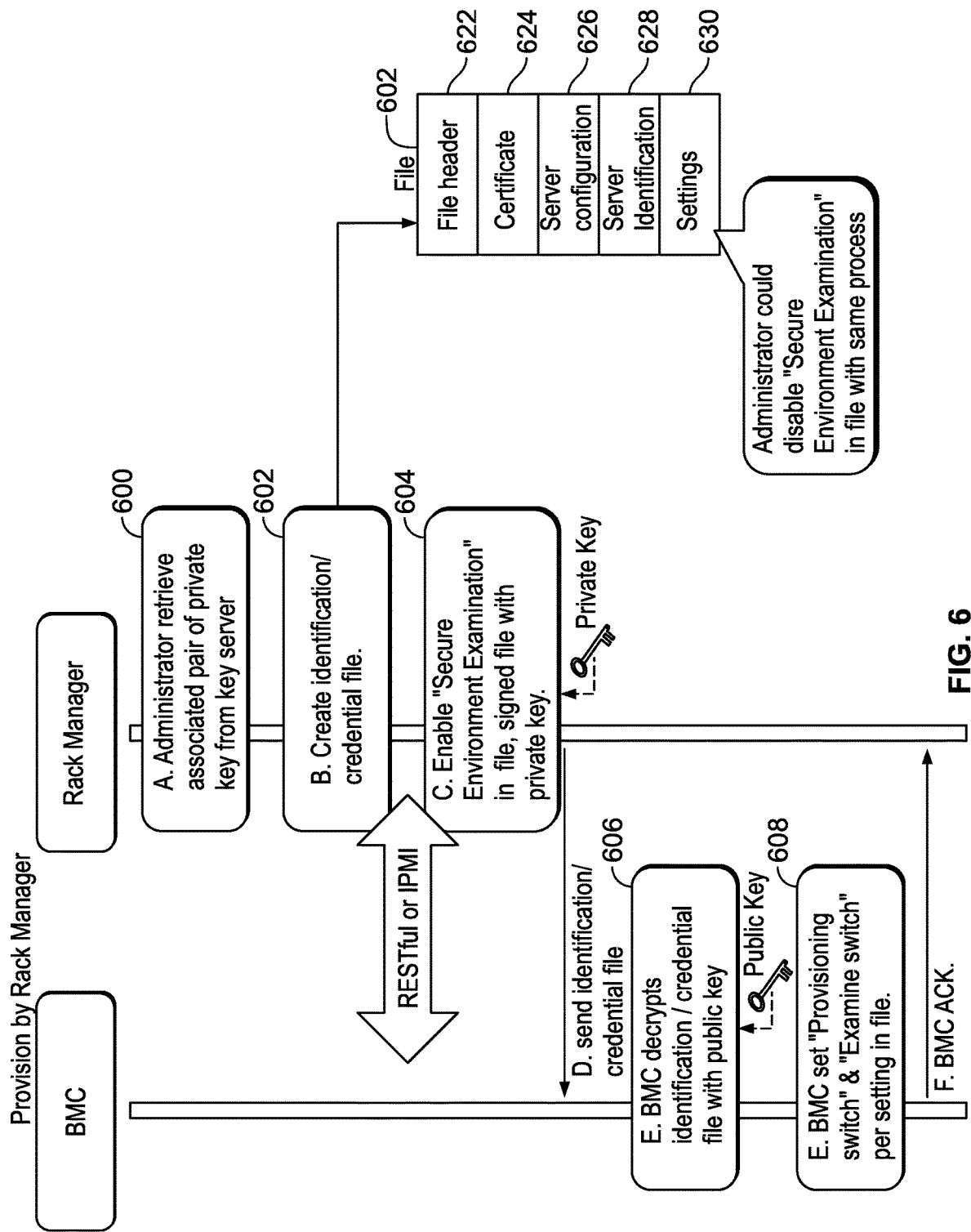
FIG. 6 is a flow diagram of the provisioning process of the secure environment examination module in FIG. 2 into a server.

FIG. 6 is a design flow of the provisioning of the secure environment examination service 181 into the server 120 for execution by the BMC 160 and the rack management controller 134 in FIG. 2. In the provisioning process, the administrator retrieves an associated pair of public and private keys from a key generation algorithm run by the network key management server 156 in FIG. 2 (600). The administrator of the rack management controller 134 then creates an identification/credential file 602 for the new server 120 that is deployed to the rack 110a and the data center 100 in FIG. 2 (604).

As shown in FIG. 6, the file 602 includes a file header field 622, a certificate field 624, a server configuration field 626, a server identification field 628 and a settings field 630. The certificate field 624 includes a certificate. The server configuration field 626 includes configuration data such as the type of operating system. The server identification field 628 contains a unique identification for the server. The settings field 630 includes an enable secure environment examination module setting as well as a provisioning setting. The administrator then enables the secure environment examination service 181 via the settings field 630 in the file 602. The administrator then signs the file 602 with the private key (604). The identification/credential file 602 is sent via a RESTful or IPMI message to the BMC 160 in FIG. 2.

The BMC 160 decrypts the identification/credential file by verifying the private key signature with the public key (606). The BMC 160 sets the provisioning switch and examine switch setting from the settings field 630 in the file 602, thus activating the secure environment examination service 181 (608). Once the server 120 is installed properly to a rack mount, such as the rack 110a in FIG. 2, with correct software configuration such as the operating system and network domain, the administrator may enable the secure environment examination module 180 and service 181 in the provisioning process. With proper credentials, the administrator may disable the secure environment examination module 180 and service 181 when the server 120 is reallocated to a different rack or location. In this manner, the secure environment examination module 180 and the service 181 protect the server 120 from unauthorized relocation.

Figure 7:
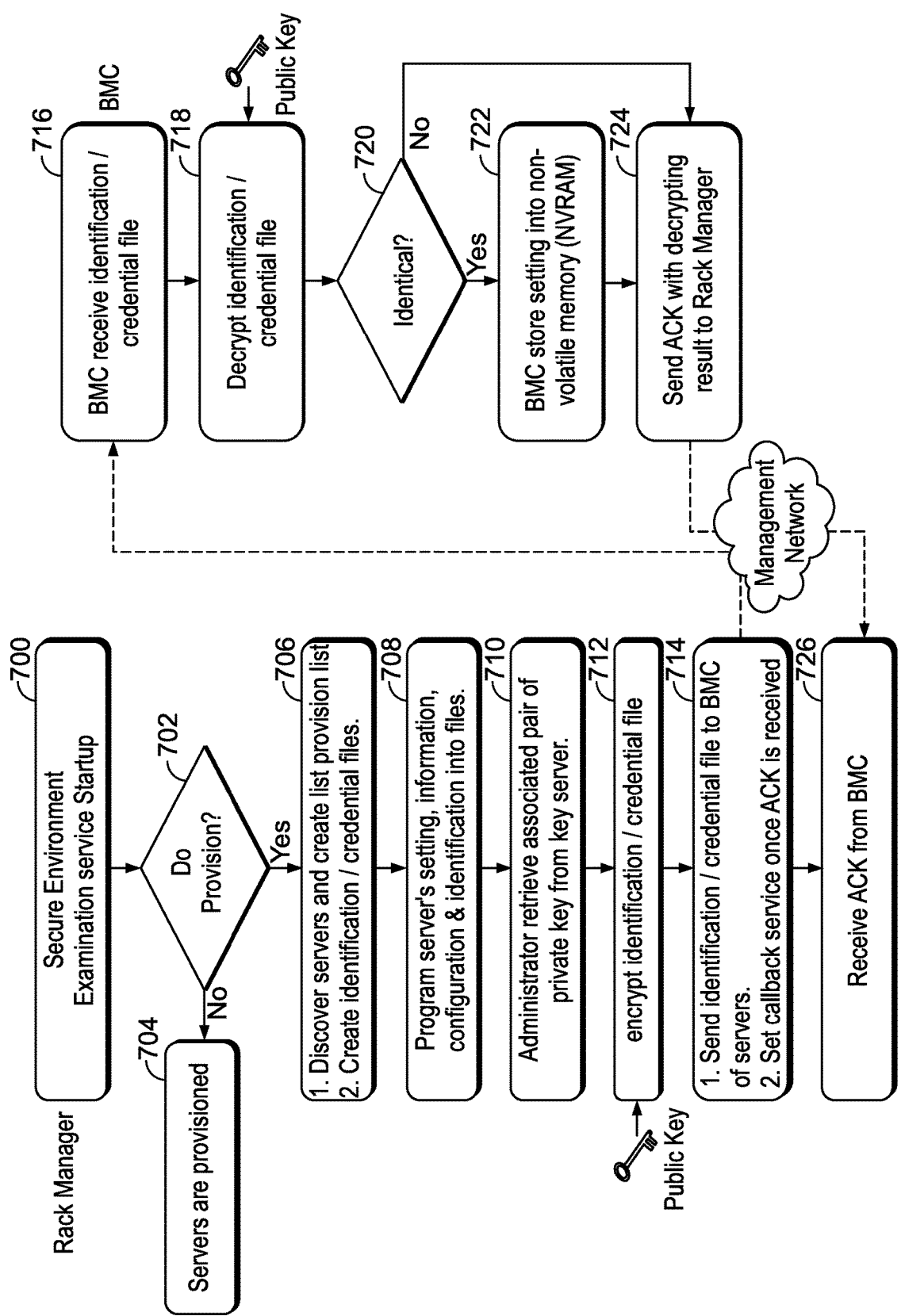
FIG. 7 is a flow diagram of the provisioning service of the secure environment examination module in FIG. 2 for a credential file.

The design flow of the process performed by a rack manager and a BMC for provisioning a new server is shown in FIG. 7. A server of a rack mount without having a rack manager could implement the design flow in FIG. 7 where the identification/credential file is generated with the data center manager, or the physical collection of a multiple rack manager (PODM).

The secure environment examination service is started at the rack management controller 134 in FIG. 2 (700). Alternatively, the service can be started from a data center manager if there is no rack management controller. The service determines whether provisioning is required (702). If there is no provisioning necessary, the servers in the rack are already provisioned (704). If provisioning of a new server or servers is necessary, the servers are discovered and a provision list is created (706). Identification/credential files are created for the newly provisioned servers. The setting information, configuration, and identification for the new server is written into the identification/credential files (708). The administrator then retrieves an associated pair of private and public keys from the network key server 156 in FIG. 2 (710).

The identification/credential file is then encrypted using the private key (712). The identification/credential file is sent to the BMC of the newly provisioned servers (714). The call back service is set once the acknowledgement is received. The BMC of the newly provisioned server receives the encrypted identification/credential file (716). The BMC of the newly provisioned server uses the public key to decrypt the identification/credential file (718). The service running on the BMC determines whether the identification and credentials are identical (720). If the credentials and identification are identical, the BMC stores the setting into non-volatile memory (NVRAM) (722). An acknowledgement is sent with the decrypted result to the rack management controller 134 (724). The rack management controller 134 then receives the acknowledgment from the BMC of the newly provisioned server (726). If the credentials and identification are not identical, then the acknowledgement and the decrypted results are sent to the rack management controller 134 (724).

The UEFI BIOS of a newly provisioned server inspects the provisioning variable of the secure environment examination module during the power-on self test (POST) phase. The provisioning switch could refer to UEFI variable which aligns with the variable of the BMC in the non-volatile memory (NVRAM). The UEFI BIOS invokes UEFI DHCP protocols to gather the IP address of the server, the IP address of the router, and Subnet mark of the connected network that was acquired from the DHCP server. The module also uses the EFI DNS protocol to perform "IPv4/IPv6 IP address to host name translation" if the provisioning switch is enabled. The UEFI BIOS stores the above network parameters as UEFI variables, and notifies the BMC to adjust the provisioning switch as "provisioned" once it is completed.

FIG. 8A shows a table 800 of the states of the provisioning switch that is sent by the rack manager in FIG. 7 when a server is first provisioned. The provisioning switch may be disabled, in which case the secure environment module is disabled and the provisioning process cannot be performed. The provisioning switch may be an enabled state, which allows the BIOS and BMC of the newly installed server to start the provisioning process and configure the server. The switch may be in a provisioned state, where both the BIOS and BMC have completed the provisioning process and enables the examine switch.

FIG. 8B shows a table 850 of the states of the examine switch. If the examine switch is disabled, then the BMC and BIOS do not need to be examined the network environment. If the examine switch is enabled, the BMC and BIOS start to examine the network environment.

The flow diagrams in FIGS. 4-7 are representative of example machine readable instructions for the BIOS or baseboard management controller. In this example, the machine readable instructions comprise an algorithm for execution by: (a) a processor; (b) a controller; and/or (c) one or more other suitable processing device(s). The algorithm may be embodied in software stored on tangible media such as, for example, a flash memory, a CD-ROM, a floppy disk, a hard drive, a digital video (versatile) disk (DVD), or other memory devices. However, persons of ordinary skill in the art will readily appreciate that the entire algorithm and/or parts thereof can alternatively be executed by a device other than a processor and/or embodied in firmware or dedicated hardware in a well-known manner (e.g., it may be implemented by an application specific integrated circuit (ASIC), a programmable logic device (PLD), a field programmable logic device (FPLD), a field programmable gate array (FPGA), discrete logic, etc.). For example, any or all of the components of the interfaces can be implemented by software, hardware, and/or firmware. Also, some or all of the machine readable instructions represented by the flowcharts of FIGS. 4-7 may be implemented manually. Further, although the example algorithm is described with reference to the flowcharts illustrated in FIGS. 4-7, persons of ordinary skill in the art will readily appreciate that many other methods of implementing the example machine readable instructions may alternatively be used. For example, the order of execution of the blocks may be changed, and/or some of the blocks described may be changed, eliminated, or combined.

As used in this application, the terms "component," "module," "system," or the like, generally refer to a computer-related entity, either hardware (e.g., a circuit), a combination of hardware and software, software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller, as well as the controller, can be a component. One or more components may reside within a process and/or thread of execution, and a component may be localized on one computer and/or distributed between two or more computers. Further, a "device" can come in the form of specially designed hardware; generalized hardware made specialized by the execution of software thereon that enables the hardware to perform specific function; software stored on a computer-readable medium; or a combination thereof.

Computing devices typically include a variety of media, which can include computer-readable storage media and/or communications media, in which these two terms are used herein differently from one another as follows. Computer-readable storage media can be any available storage media that can be accessed by the computer, is typically of a non-transitory nature, and can include both volatile and nonvolatile media, as well as removable and non-removable media. By way of example, and not limitation, computer-readable storage media can be implemented in connection with any method or technology for storage of information, such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media that can be used to store desired information. Computer-readable storage media can be accessed by one or more local or remote computing devices, e.g., via access requests, queries, or other data retrieval protocols, for a variety of operations with respect to the information stored by the medium.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations, as may be desired and advantageous for any given or particular application.

What is claimed is:

1. A method of protecting a network device in an equipment rack coupled to a network within a data center, the method comprising:
    storing a previously generated credential file associated with the network device, the credential file generated via a server within the data center external to the equipment rack;
    enabling power to the network device;
    encrypting the credential file via a secure key server within the data center external to the equipment rack;
    sending the encrypted credential file to a baseboard management controller of the network device;
    decrypting the encrypted credential file;
    comparing the decrypted credential file with a static content file stored in a memory of the network device; and
    shutting down the power to the network device if the credential file does not match the static content file.

2. The method of claim 1, further comprising:
    storing an IP address of a router of the network and an IP address of the network device in the static content file in the memory;
    gathering the IP address of the router and the IP address of the network device via a query to a network manager when power is enabled to the network device;
    comparing the gathered IP addresses of the router and the network device with the stored IP addresses of the router and network device; and
    preventing an operating system of the network device from booting if the IP addresses do not match.

3. The method of claim 2, wherein the comparison is performed by a basic input output system of the network device.

4. The method of claim 2, wherein the static content file is stored in the memory when the network device is provisioned to the network.

5. The method of claim 1, wherein the encrypted credential file is encrypted by a private key and the baseboard management controller decrypts the encrypted credential file with a matching public key.

6. The method of claim 1, wherein the credential file is sent by a rack manager.

7. The method of claim 1, wherein the network device is a server.

8. The method of claim 1, wherein the credential file includes identification data associated with the network device and configuration data associated with the network device.

9. The method of claim 1, wherein the stored credential file is discovered from the network device when the network device is provisioned to the network.

10. A method of protecting a network device in an equipment rack coupled to a network within a data center, the method comprising:
    storing in a static content file an IP address of a router of the network and an IP address of the network device in the equipment rack coupled to the network;
    on powering up the network device, gathering the IP address of the router and the IP address of the network device via a query to a network manager within the data center, the network manager being external to the equipment rack;
    comparing the gathered IP addresses of the router and the network device with the stored IP addresses of the router and the network device; and
    preventing an operating system of the network device from booting if the IP addresses do not match.

11. The method of claim 10, wherein the comparison is performed by a basic input output system of the network device.

12. The method of claim 10, wherein the static content file is stored in a memory when the network device is provisioned to the network.

13. The method of claim 10, wherein the network device is a server.

14. The method of claim 10, further comprising:
storing a credential file associated with the network device;
encrypting the credential file when the network device is powered up;
sending the encrypted credential file to a baseboard management controller of the network device;
decrypting the encrypted credential file;
comparing the decrypted credential file with the static content file stored in a memory of the network device; and
shutting down the power to the network device if the credential file does not match the static content file.

15. The method of claim 14, wherein the encrypted credential file is encrypted by a private key and the baseboard management controller decrypts the encrypted credential file with a matching public key.

16. The method of claim 14, wherein the credential file is sent by a rack manager.

17. The method of claim 14, wherein the credential file includes identification data associated with the network device and configuration data associated with the network device.

18. The method of claim 14, wherein the stored credential file is discovered from the network device when the network device is provisioned to the network.

19. A network device in an equipment rack coupled to a network within a data center, the network device comprising:
a memory storing a static credential file generated via a server within the data center external to the equipment rack;
a basic input output system;
an operating system executed by a controller;
a security module operable to:
gather an IP address of the router and an IP address of the network device via a query to a network manager from the basic input output system when power is enabled to the network device, the network manager being within the data center external to the equipment rack;
compare the gathered IP addresses of the router and the network device with stored IP addresses of the router and the network device in the static credential file; and
prevent the operating system of the network device from booting if the IP addresses do not match; and
a baseboard management controller controlling power to the network device, the baseboard management controller operable to:
receive an encrypted credential file;
decrypt the encrypted credential file;
compare the decrypted credential file with the static content file; and
shut down power to the network device if the credential file does not match the static content file.

* * * * *